(12) United States Patent
Koch

(10) Patent No.: US 9,856,174 B2
(45) Date of Patent: Jan. 2, 2018

(54) BINDER BASED ON ACTIVATED GROUND GRANULATED BLAST FURNACE SLAG USEFUL FOR FORMING A CONCRETE TYPE MATERIAL

(71) Applicant: Stephan Steinkeller, Ras al Khaimah (AE)

(72) Inventor: Gerhard Koch, Salzburg (AT)

(73) Assignee: Stephan Steinkeller, Al Ham Bra—Ras Al Khaimah (AE)

( * ) Notice: Subject to any disclaimer, the term of this patent is extended or adjusted under 35 U.S.C. 154(b) by 0 days.

(21) Appl. No.: 15/024,775

(22) PCT Filed: Sep. 26, 2014

(86) PCT No.: PCT/EP2014/070676
§ 371 (c)(1),
(2) Date: Mar. 24, 2016

(87) PCT Pub. No.: WO2015/044381
PCT Pub. Date: Apr. 2, 2015

(65) Prior Publication Data
US 2016/0214899 A1    Jul. 28, 2016

(30) Foreign Application Priority Data
Sep. 27, 2013 (EP) .................... 13186485

(51) Int. Cl.
*C04B 28/08* (2006.01)
*C04B 7/153* (2006.01)
*C04B 111/00* (2006.01)

(52) U.S. Cl.
CPC ............ *C04B 28/08* (2013.01); *C04B 7/1535* (2013.01); *C04B 2111/00043* (2013.01); *Y02P 40/143* (2015.11)

(58) Field of Classification Search
CPC ... C04B 7/1535; C04B 22/062; C04B 22/148; C04B 22/064; C04B 22/10; C04B 28/08; C04B 40/0608; C04B 2111/00043
See application file for complete search history.

(56) References Cited

U.S. PATENT DOCUMENTS 4,146,402 A * 3/1979 Kira ........................ C04B 28/08
106/644
5,439,505 A   8/1995 Krofchak

FOREIGN PATENT DOCUMENTS

| CN | 101100854 A | * | 1/2008 |
| DE | 2900613 | | 7/1980 |
| DE | 3133503 | | 3/1983 |
| EP | 0029069 | | 5/1981 |
| FR | 772204 | | 10/1934 |
| JP | S5490223 | | 7/1979 |
| JP | 56-84360 A | * | 7/1981 |
| KR | 2002-0039520 A | * | 5/2002 |

OTHER PUBLICATIONS

International Search Report for PCT/EP2014/070676, Completed by the European Patent Office on Jan. 29, 2015, 4 Pages.
Extended European Search Report for European Application No. EP 13186485.2, Completed by the European Patent Office, dated Mar. 18, 2014, 14 Pages.
Lu et al. Advanced Materials Research 2012, vol. 454, pp. 11-16, "Chemical Activation of Cementing Properties of Granulated Blast Furnace Slags".
Database WPI, Week 197935, Thomson Scientific, Publication Date Jul. 17, 1979, London GB; AN 1979-63718B, XP-002721323, 1 Page, "Light Inorganic Material Manufacture Contain Slag Gypsum Alkaline Compound React Promote Water Option Reinforced Fibre Add".

* cited by examiner

*Primary Examiner* — Anthony J Green
(74) *Attorney, Agent, or Firm* — Brooks Kushman P.C.

(57) ABSTRACT

A binder material useful for forming a concrete type material includes, calculated on a dry, water and carbon dioxide free basis, a base component constituting 50-95 wt % of the binder material, the base component having ground granulated blast furnace slag and an activator component constituting 5-50 wt % of the binder material. The activator component includes aluminum sulfate and a sodium hydroxide generating compound. The final binder material includes, calculated on a dry, water and carbon dioxide free basis, ground granulated blast-furnace slag 35-95 wt %, aluminum sulfate $Al_2(SO_4)_3$ 1-25 wt %, and sodium hydroxide generating compound 4-35 wt %.

13 Claims, No Drawings

BINDER BASED ON ACTIVATED GROUND GRANULATED BLAST FURNACE SLAG USEFUL FOR FORMING A CONCRETE TYPE MATERIAL

CROSS-REFERENCE TO RELATED APPLICATION

This application is the U.S. national phase of PCT Application No. PCT/EP2014/070676 filed on Sep. 26, 2014, which claims priority to EP Patent Application No. 13186485.2 filed on Sep. 27, 2013, the disclosures of which are incorporated in their entirety by reference herein.

TECHNICAL FIELD OF THE INVENTION

The present invention relates to a binder material useful for forming a concrete type material.

The present invention further relates to a concrete type material made using the binder material, and a method of producing a concrete type material.

BACKGROUND ART

Binder materials are used in many building and construction applications for forming building materials. A binder material useful for this purpose is the binder material known as Portland cement. The Portland cement comprises limestone, $CaCO_3$, which is mixed with silicon oxide, $SiO_2$, and heated in a cement kiln to form cement clinker. The cement clinker is finely ground together with gypsum, $CaSO_4$, to form the final Portland cement. In preparing a building material, Portland cement is mixed with water and an aggregate material, comprising for example sand and/or gravel, to form concrete.

To reduce the cost of the concrete, a portion of the Portland cement could be replaced with ground granulated blast furnace slag, a material obtained from steel making processes and which comprises CaO, $SiO_2$, and $Al_2O_3$.

EP 0 029 069 B1 discloses a hydraulic binder composition comprising as its main components fine powder of granulated blast furnace slag and lightly calcined anhydrous gypsum or gypsum hemihydrate. The hydraulic binder composition of EP 0 029 069 B1 has, however, been found to generate a concrete with relatively low mechanical strength.

SUMMARY OF THE INVENTION

It is an object of the present invention to provide a binder material which is useful for forming a concrete type material and which provides an improved combination of excellent mechanical properties and low cost compared to the prior art.

This object is achieved by a binder material useful for forming a concrete type material. The binder material comprises, calculated on a dry, water and carbon dioxide free basis:
i) a base component constituting 50-95 wt % of the binder material and comprising ground granulated blast furnace slag, and
ii) an activator component constituting 5-50 wt % of the binder material and comprising
   a. aluminum sulfate, and
   b. sodium hydroxide generating compound,
wherein the final binder material comprises, calculated on a dry, water and carbon dioxide free basis:

| | |
|---|---|
| ground granulated blast furnace slag: | 35-95 wt % |
| aluminum sulfate, $Al_2(SO_4)_3$: | 1-25 wt % |
| sodium hydroxide generating compound: | 4-35 wt %. |

An advantage of this binder material is that it is suitable for preparing a concrete type material having high strength and low cost.

DEFINITIONS

In the present disclosure some components are indicated to be calculated "on a dry, water and carbon dioxide free basis". By this is meant that the weight relation refers only to the component as such, disregarding any water or carbon dioxide bound to the molecule and also disregarding any water present as moisture. For example, solid aluminum sulfate is normally sold on a commercial scale as aluminum sulfate hydrate, $Al_2(SO_4)_3 \cdot xH_2O$, where x is typically 14-15, but when referred to as "on a dry, water and carbon dioxide free basis" in the present disclosure aluminum sulfate is seen as $Al_2(SO_4)_3$ without involving the hydrate water molecules.

As used hereinafter the expression "final binder material" means that binder material which results after the base component, the activator component and any additives have been mixed with each other, and the binder material is ready for use. By "ready for use" is meant that the binder material is ready for being mixed with water and aggregate, such as sand, rubble, macadam, etc., to form a concrete type of material.

Binder Material:

The binder material according to the present invention comprises, calculated on a dry, water and carbon dioxide free basis:
i) a base component constituting 50-95 wt % of the binder material and comprising ground granulated blast furnace slag, and
ii) an activator component constituting 5-50 wt % of the binder material.

This means that the binder material comprises a base component and an activator component. Said base component comprises in turn ground granulated blast furnace slag. However the base component may comprise other materials than the ground granulated blast furnace slag.

Base Component:

The base component comprises ground granulated blast furnace slag (GGBS). The GGBS is a product obtained from steel production in blast furnaces. Molten iron slag leaving the blast furnace is quenched by steam or water to form a granular and glassy product. The product is dried and ground to a fine powder. Preferably, the GGBS used in the present binder material has a particle size corresponding to a Blaine number of at least 3500 $cm^2/g$.

An advantage of GGBS is that it is a rest-product, and that it does not require treatment in an energy consuming cement kiln. Thus, the present binder material can be produced with very low emissions of carbon dioxide, $CO_2$, to the environment.

The ground granulated blast furnace slag (GGBS) comprises aluminum oxide, $Al_2O_3$, and silicon oxide, $SiO_2$. The activator component, which will be described in more detail hereinafter, results in an alkaline activation of aluminum oxide, $Al_2O_3$, and silicon oxide, $SiO_2$, and causes them to react to form aluminum silicate ($Al_2O_3 \cdot 2SiO_2 \cdot 2H_2O$). Aluminum silicate is a high strength component which is beneficial when using the present binder material for producing a concrete type material.

The base component preferably comprises GGBS in such an amount that the final binder material comprises 35-95 wt %, more preferably 40-90 wt %, of GGBS calculated on a dry, water and carbon dioxide free basis. Hence, the base component in itself could comprise up to 100 wt % GGBS.

The base component constitutes 50-95 wt % of the final binder material, calculated on a dry, water and carbon dioxide free basis. More preferably, the base component constitutes 55-90 wt % of the final binder material, calculated on a dry, water and carbon dioxide free basis.

The base component may comprise further components in addition to the GGBS. According to one embodiment the base component comprises at least one further substance selected in the group of substances comprising clay, marl, fly ash and aluminum oxide.

According to one embodiment, the base component comprises clay in such an amount that the final binder material comprises 0.5-20 wt % clay calculated on a dry, water and carbon dioxide free basis. The base component itself could comprise up to 30 wt % clay. The clay could be either natural or burnt clay. If the clay is burnt clay, it is preferably burnt by being heat treated at a temperature of 600-850° C.

According to one embodiment, the base component comprises marl in such an amount that the final binder material comprises 0.5-20 wt % marl calculated on a dry, water and carbon dioxide free basis. The base component itself could comprise up to 30 wt % marl. The marl could be either natural or burnt marl. If the marl is burnt marl, it is preferably burnt by being heat treated at a temperature of 600-850° C.

According to one embodiment, the base component comprises fly ash in such an amount that the final binder material comprises 0.5-20 wt % fly ash calculated on a dry, water and carbon dioxide free basis. The base component itself could comprise up to 30 wt % fly ash. Fly ash often comprises substantial amounts of silicon oxide, $SiO_2$. Therefore, fly ash may be a preferred substance if the GGBS comprises relatively low concentrations of silicon oxide, $SiO_2$.

According to one embodiment, the base component comprises at least 20 wt %, and more preferably at least 25 wt %, aluminum oxide, $Al_2O_3$, calculated on a dry, water and carbon dioxide free basis. An advantage of this embodiment is that a relatively high concentration of aluminum oxide increases the strength of a concrete type material made from the binder material. If the amount of aluminum oxide, $Al_2O_3$, is not sufficient in the GGBS, then more aluminum oxide could preferably be added to the base component, for example in the form of a mineral comprising aluminum oxide. For example, aluminum oxide, for example amorphous aluminum oxide, could be added to the base component in an amount which corresponds to 5-15 wt %, calculated on a dry, water and carbon dioxide free basis, of the final binder material.

According to one embodiment, the base component comprises at least 15 wt % silicon oxide, $SiO_2$, calculated on a dry, water and carbon dioxide free basis. An advantage of this embodiment is that a relatively high concentration of silicon oxide increases the strength of a concrete made from the binder material. If the amount of silicon oxide, $SiO_2$, is not sufficient in the base component, then more silicon oxide could be supplied, for example in the form a mineral comprising silicon oxide.

Preferably, the base component comprises at least 20 wt % aluminum oxide, as $Al_2O_3$, calculated on a dry, water and carbon dioxide free basis, and preferably at least 15 wt % silicon oxide, as $SiO_2$, calculated on a dry, water and carbon dioxide free basis. An advantage of this embodiment is that with alkaline activation of the binder material, which will be described hereinafter, the aluminum oxide and the silicon oxide combines to form a substantial amount of aluminum silicate ($Al_2O_3 \cdot 2SiO_2 \cdot 2H_2O$) upon alkaline activation.

Activator Component:

The activator component is intended for alkaline activation of aluminum oxide, $Al_2O_3$, and silicon oxide, $SiO_2$, of the base component. The alkaline activation involves sodium ions.

The activator component constitutes 5-50 wt %, calculated on a dry, water and carbon dioxide free basis, of the final binder material. More preferably, the activator component constitutes 10-45 wt %, calculated on a dry, water and carbon dioxide free basis, of the final binder material.

Without being bound by any theory, it appears as if the sodium ions result in improved solubility of aluminum ions, and makes the aluminum ions more susceptible to reaction with the silicon oxide, to form a high portion of the desired aluminum silicate ($Al_2O_3 \cdot 2SiO_2 \cdot 2H_2O$). Furthermore, since the aluminum ions are urged to form aluminum silicate, the aluminum ions will be less prone to form ettringite (3CaO $Al_2O_3$ 3 $CaSO_4 \cdot 32H_2O$), which is less desired, since it has lower strength than the aluminum silicate. Thereby, it appears as if the use of the present activator component results in increased formation of desired aluminum silicate, and a reduced formation of the less desired ettringite.

The activation based on sodium ions involves a sodium hydroxide generating compound. The sodium hydroxide generating compound may, according to one embodiment, include burnt lime, CaO, and sodium carbonate, $Na_2CO_3$. Both burnt lime and sodium carbonate have relatively moderate cost, and are easy to handle. When the binder material is mixed with water when preparing a concrete type of material the following reaction occurs between burnt lime, CaO, and sodium carbonate, $Na_2CO_3$:

$$CaO + Na_2CO_3 + H_2O \Longrightarrow 2NaOH + CaCO_3 \qquad [1.1]$$

By the above reaction, the sodium hydroxide, NaOH, is formed in conjunction with using the binder material for preparing a concrete type material, when water is added. During the alkaline activation of the base component a high concentration of sodium hydroxide will be formed in the mixture of binder material, aggregate and water. The sodium hydroxide functions as an activator, enhancing the solubility of aluminum to increase the formation of aluminum silicate ($Al_2O_3 \cdot 2SiO_2 \cdot 2H_2O$) as discussed hereinabove.

The sodium hydroxide generating compound of the activator component preferably comprises sodium carbonate and burnt lime in a relation between burnt lime and sodium carbonate that preferably fulfils the ratio between burnt lime and sodium carbonate of:

$CaO:Na_2CO_3=1:1$ to 1:6, more preferably 1:1 to 1:5, and even more preferably 1:1 to 1:3, on a weight to weight basis, and calculated on a dry, water and carbon dioxide free basis.

According to one embodiment, the sodium hydroxide generating compound of the activator component comprises burnt lime, CaO, in such an amount that the final binder material comprises 1.5 to 5 wt % CaO, calculated on a dry, water and carbon dioxide free basis. This amount has been found to provide for a suitable activation of the base component.

According to one embodiment, the sodium hydroxide generating compound of the activator component comprises sodium carbonate, $Na_2CO_3$, in such an amount that the final binder material comprises 2-25 wt % $Na_2CO_3$, calculated on a dry, water and carbon dioxide free basis, more preferably 10-20 wt % $Na_2CO_3$, calculated on a dry, water and carbon dioxide free basis. This amount has been found to provide for an efficient activation of the base component.

According to one embodiment the sodium hydroxide generating compound comprises burnt lime, CaO, and sodium carbonate, $Na_2CO_3$, but no or almost no sodium hydroxide. This embodiment provides for a sodium hydroxide generating compound that has a low cost.

According to one embodiment the sodium hydroxide generating compound comprises burnt lime, CaO, sodium carbonate, $Na_2CO_3$, and also sodium hydroxide, NaOH. The sodium hydroxide is immediately available for a reaction to form sodium ions improving solubility of aluminum ions. The sodium hydroxide generating compound may comprise sodium hydroxide in such an amount that the final binder material comprises 1-15 wt % NaOH, more preferably 1-12 wt % NaOH, calculated on a dry, water and carbon dioxide free basis. This embodiment provides for both low cost and a high and easily predictable concentration of sodium ions. Furthermore, the desired properties of the final binder material can be tuned very accurately, for example by adding a base load of burnt lime, CaO, and sodium carbonate, $Na_2CO_3$, and then gradually obtaining/adding an amount of sodium hydroxide, NaOH, until a final binder material with the desired properties is achieved.

The activator component also comprises aluminum sulfate, $Al_2(SO_4)_3$. According to one embodiment the activator component also comprises calcium sulfate, $CaSO_4$. Without being bound by any theory, the sulfate containing substance of the activator component appears to contribute to the activation of the base component. Thus, the base component, comprising GGBS, is activated both by alkali and sulfate.

According to one embodiment, the activator component comprises aluminum sulfate, $Al_2(SO_4)_3$, in such an amount that the final binder material comprises 1 to 25 wt % $Al_2(SO_4)_3$, calculated on a dry, water and carbon dioxide free basis, more preferably 5-20 wt % $Al_2(SO_4)_3$, calculated on a dry, water and carbon dioxide free basis, and still more preferably 10-20 wt % $Al_2(SO_4)_3$, calculated on a dry, water and carbon dioxide free basis. These amounts of aluminum sulfate have proven to result in efficient activation of the base component.

The aluminum sulfate, $Al_2(SO_4)_3$, forms upon being mixed with water an acid sulfuric solution with very low pH value. To obtain the desired activation of the base component such acid component is neutralized with sodium hydroxide, NaOH, originating from the sodium hydroxide generating compound of the activator component. The suitable amount of sodium hydroxide generating compound of the activator component depends, in addition to other factors, such as the activation of the base component, also on the amount of $Al_2(SO_4)_3$. The activator component preferably comprises aluminum sulfate, $Al_2(SO_4)_3$, and sodium hydroxide generating compound in such a relation that 1 part by weight of the final binder material mixed with 0.3 parts by weight of water results in a basic pH value of at least 12.5. Preferably, the amount of sodium hydroxide generating compound is large enough to achieve a basic pH value of at least 12.5, preferably a pH of around 13, when the final binder material, an aggregate material and water have been mixed for forming a concrete type material.

According to one embodiment, the activator component comprises calcium sulfate, $CaSO_4$, in such an amount that the final binder material comprises maximum 5 wt %, more preferably maximum 2 wt %, of $CaSO_4$, calculated on a dry, water and carbon dioxide free basis. Without being bound by any theory, it appears as if the presence of calcium sulfate promotes the formation of ettringite. Hence, the presence of calcium sulfate appears to partly counteract the aluminum silicate promoting effect of the alkaline activation. Thus, according to this embodiment, the calcium sulfate is kept at a low concentration. According to a preferred embodiment, the activator component comprises calcium sulfate, $CaSO_4$, in such an amount that the final binder material comprises less than 1 wt % $CaSO_4$, calculated on a dry, water and carbon dioxide free basis.

Further Additives:

The binder material may, in addition to the base component and the activator component, comprise one or several further additives to achieve desired properties for the binder material.

The binder material may comprise plasticizers to improve workability. The final binder material may comprise, for example, 0.5 to 3 wt %, calculated on a dry, water and carbon dioxide free basis, of a suitable plasticizer.

According to one embodiment the final binder material comprises a sodium complex binder. The sodium complex binder may be advantageous under some conditions for binding sodium ions that are either free, or are part of easily soluble compounds in the concrete type material, to reduce leaching of sodium ions from the concrete type material. According to one embodiment the sodium complex binder is EDTA, ethylenediaminetetraacetic acid. According to one embodiment the final binder material comprises 0.1-1.0 wt % EDTA, calculated on a dry, water and carbon dioxide free basis.

The final binder material preferably has a Blaine number of at least 3500 $cm^2/g$. This provides for an efficient and highly reactive binder material.

According to a further aspect, the present invention concerns a concrete type material, which comprises a binder material as described hereinbefore and an aggregate material. An advantage of this concrete type material is that it provides for high mechanical strength.

According to a still further aspect, the present invention concerns a method of producing a concrete type material, the method comprising mixing a binder material as described hereinabove with water and an aggregate material, and allowing the mixture to harden to form the concrete type material. An advantage of this method is that it provides for forming a high strength concrete type material with limited formation of carbon dioxide in the process.

According to a preferred embodiment the method comprises mixing 1 part by weight of the binder material with 2-8, more preferably 2-5, parts by weight of the aggregate material, and adding 0.2-1.5 parts by weight of water. This method provides for a concrete type material of high mechanical strength.

Further objects and features of the present invention will be apparent from the description of detailed examples and the claims.

DETAILED DESCRIPTION OF EXAMPLES OF THE INVENTION

Example 1

A binder material according to Example 1 was prepared by using a base component, an activator component and optionally a sodium complex binder according to a first embodiment of the present invention.

The base component had the following composition, in wt % of the final binder material:

Ground granulated blast furnace slag (GGBS), in the form of the product "AHWZ Gemahlener Hüttensand", available from the company Firma Bernegger GmbH, Molln, A T, the product having a Blaine number of 5010 cm²/g, and a residue after sieving through a 45 micrometer sieve of 7.5 wt %, the amount calculated on a dry, water and carbon dioxide free basis:

49.0 wt %

Amorphous aluminum oxide, as Aluminiumoxyd trocken SO143, obtained from Dadco Alumina Ltd, the facilities at Stade, DE, the amount calculated as $Al_2O_3$, on a dry, water and carbon dioxide free basis:

9.5 wt %

Thus, the base component constituted totally 58.5 wt %, calculated on a dry, water and carbon dioxide free basis, of the final binder material.

The base component comprised, after mixing the ground granulated blast furnace slag and the amorphous aluminum oxide, the following components:

Aluminum oxide, $Al_2O_3$, calculated on a dry, water and carbon dioxide free basis: 32.3 wt %

Silicon oxide, $SiO_2$, calculated on a dry, water and carbon dioxide free basis: 21.3%

Furthermore, the binder material according to Example 1 comprised an activator component. The activator component had the following composition, in wt % of the final binder material:

Sodium carbonate, purchased as Natrium carbonat light, CAS 497-19-8, from Soda Polska Ciech, Inowroclaw, PL, the amount calculated as $Na_2CO_3$, on a dry, water and carbon dioxide free basis:

12.5 wt %

Aluminum sulfate, purchased as Aluminiumsulfat 17/18, CAS 16828-12-9, from Ferdco Deutschland GmbH, Nienburg, DE, the amount calculated as $Al_2(SO_4)_3$, on a dry, water and carbon dioxide free basis:

15 wt %

Sodium hydroxide, purchased as Ätznatron, CAS 1310-73-2 from BASF The Chemical Company, Ludwigshafen, DE, the amount calculated as NaOH on a dry, water and carbon dioxide free basis:

10 wt %.

Calcium oxide, purchased as Kalkoxyd from Kalkwerk Dullinger, Salzburg-Elsbethen, AT, the amount calculated as CaO, on a dry, water and carbon dioxide free basis:

3 wt %

Thus, the activator component constituted totally 40.5 wt % calculated on a dry, water and carbon dioxide free basis, of the final binder material.

Optionally, the final binder material may also comprise a sodium complex binder, for example EDTA (Ethylenediaminetetraacetic Acid):

up to 1 wt %

Hence, the composition of the final binder material according to Example 1 may be the following, calculated on a dry, water and carbon dioxide free basis:

| | |
|---|---|
| Base component: | 58.5 wt % |
| Activator component: | 40.5 wt % |
| Complex binder: | up to 1 wt %* |
| TOTAL final binder material: | 100 wt % |

*If the complex binder amounts to less than 1 wt %, or if there is no complex binder at all, the amounts of the base component and the activator component are increased correspondingly.

The base component and the activator component indicated above, but no sodium complex binder, were supplied to a mixer of the type PFT Multimix, available from Knauf PFT GmbH & Co. KG, Iphofen, DE, and where mixed with each other to form a homogenous powder mixture constituting the final binder material of Example 1.

The final binder material of Example 1 as described above was then used to prepare a concrete type material. The concrete type material was formed by mixing the following components in a concrete mixer (AL-KO TOP 1402 R) during one hour, the concrete type material comprising the following ingredients:

1) Final binder material (according to Example 1) calculated on a dry, water and carbon dioxide free basis:
   250 parts by weight,
2) CEN Normsand, sand according to DIN-EN 196-1, available from the company Normensand GmbH, Beckum, DE:
   670 parts by weight,
3) Water:
   80 parts by weight.

The total weight of the mixture was about 10 kg.

The pH of the mixture of the final binder material, aggregate and water according to Example 1 was found to be pH 13.

Example 2

A binder material according to Example 2 was prepared by using a base component and an activator component according to a second embodiment of the present invention.

The base component had the following composition, in wt % of the final binder material:

Ground granulated blast furnace slag (GGBS) (same type as in Example 1), calculated on a dry, water and carbon dioxide free basis:

55 wt %

Amorphous aluminum oxide (same type as Example 1) amount calculated as $Al_2O_3$, on a dry, water and carbon dioxide free basis:

10 wt %

Thus, the base component constituted totally 65.0 wt % calculated on a dry, water and carbon dioxide free basis, of the final binder material.

The activator component had the following composition, in wt % of the final binder material:

Sodium carbonate (same type as Example 1) the amount calculated as $Na_2CO_3$, on a dry, water and carbon dioxide free basis:

17 wt %

Aluminum sulfate (same type as Example 1) the amount calculated as $Al_2(SO_4)_3$, on a dry, water and carbon dioxide free basis:

15 wt %

Calcium oxide (same type as Example 1) the amount calculated as CaO, on a dry, water and carbon dioxide free basis:

3 wt %

Thus, the activator component constituted totally 35 wt % calculated on a dry, water and carbon dioxide free basis of the final binder material.

Hence, the composition of the final binder material according to Example 2 was the following, calculated on a dry, water and carbon dioxide free basis:

| | |
|---|---|
| Base component: | 65 wt % |
| Activator component: | 35 wt % |
| TOTAL final binder material: | 100 wt % |

The base component and the activator component were mixed with each other, in a manner similar to that described with respect to Example 1, to form a final binder material. Then the final binder material of Example 2 was used for preparing a concrete type material using a concrete mixer, similar as described above with reference to Example 1, the concrete type material comprising the following ingredients:

1) Final binder material (according to Example 2), calculated on a dry, water and carbon dioxide free basis:
   250 parts by weight,
2) CEN Normsand (same type as Example 1):
   670 parts by weight
3) Water:
   80 parts by weight The total weight of the concrete type mixture of Example 2 was 100 kg.

The above concrete type mixture was used to form test samples of the concrete type material made according to Example 2.

Comparative Example

A Comparative Example concrete material was prepared using a prior art cement. The Comparative Example concrete material comprising the following ingredients:

1) Portland cement, purchased as Portlandzement EN 197-1, Chromatarm, CEII/B-M (S-L) 32.5 R, from the company Zementfabrik Leube, Salzburg Gartenau, AT, calculated on a dry, water and carbon dioxide free basis:
   250 parts by weight,
2) CEN Normsand (same type as Example 1):
   670 parts by weight,
3) Water:
   80 parts by weight, The total weight of the concrete mixture of the Comparative Example was 100 kg.

The concrete mixture was used to form test samples of the concrete type material made according to the Comparative Example, similar to what was made for Example 2.

Test Results

The test samples prepared in Example 2 and in the Comparative Example 1 were tested in accordance with test standard DIN 1045. The results were the following:

TABLE 1

Compressive strength of test sample according to Example 2 and according to Comparative Example

| Characteristic cylinder compressive strength (DIN 1045) [N/mm$^2$] | Example 2 | Comparative Example |
|---|---|---|
| Drill core 1 day old | 15.8 | 11.5 |
| Drill core 3 days old | 34.8 | 15.9 |
| Drill core 7 days old | 42.9 | 20.2 |
| Drill core 28 days old | 50.8 | 32.8 |
| Drill core 56 days old | 52.3 | 34.5 |

From Table 1 it is clear that the concrete type of material of Example 2 has a substantially higher mechanical strength than the prior art material of the Comparative Example, based on Portland cement. For the Drill core having an age of 28 days the concrete type of Example 2 has 54% higher compressive strength than the concrete of the Comparative Example.

Example 3

A binder material according to the above mentioned Example 2 according to the present invention was tested further.

Preparation of the binder paste was done as follows. 500 g of binder was mixed with water in a mortar mixer for 3 minutes at low speed, then filled into a vicat ring and the penetration depth was measured with a vicat instrument. Water was added until a penetration depth of (6±2) mm between dipstick and base plate had been reached.

Determination of compressive strength in accordance with ÖNORM EN 196-1 (April 2005), was performed. Prisms with a size of 4×4×16 cm were prepared for the test. The mortar was compacted with a vibration table. Then the prisms were stored in humid boxes at 20° C./90% relative humidity. Compressive strength was determined using a universal compression testing machine at a load increase of 2400±200 N/s.

Tests were also performed on the material according to the present invention with regards to strength of the cement. Determinations were made in accordance with ÖNORM EN 196-1, par 1, after 1 and 7 days.

TABLE 2

Test results of test sample according to Example 3.

| Age of the specimen | Dimensions of specimen [mm] | Raw density [g/cm$^3$] | Bending tensile strength [N/mm$^2$] | Compressive strength [N/mm$^2$] |
|---|---|---|---|---|
| 24 hours | 40 × 40 × 160 | 2.24 | 4.0 | 13.9 |
| 7 days | 40 × 40 × 160 | 2.18 | 5.6 | 34.2 |

Example 4

A first binder material according to Example 4 was prepared by using a base component, an activator component and optionally a sodium complex binder.

The base component had the following composition, in wt % of the final binder material:

Ground granulated blast furnace slag (GGBS), in the form of the product "AHWZ Gemahlener Hüttensand", available from the company Firma Bernegger GmbH, Molln, AT, the product having a Blaine number of 5010 cm$^2$/g, and a residue after sieving through a 45 micrometer sieve of 7.5 wt %, the amount calculated on a dry, water and carbon dioxide free basis:
   75.0 wt %
Metakaolin:
   9.5 wt %

Thus, the base component constituted totally 84.5 wt %, calculated on a dry, water and carbon dioxide free basis, of the final binder material.

Furthermore, the binder material according to Example 4 comprised an activator component. The activator component had the following composition, in wt % of the final binder material:

Sodium:

Sodium carbonate, purchased as Natrium carbonat light, CAS 497-19-8, from Soda Polska Ciech, Inowroclaw, PL, the amount calculated as Na$_2$CO$_3$, on a dry, water and carbon dioxide free basis:

12.5 wt %

Calcium oxide, purchased as Kalkoxyd from Kalkwerk Dullinger, Salzburg-Elsbethen, AT, the amount calculated as CaO, on a dry, water and carbon dioxide free basis:

3 wt %

Thus, the activator component constituted totally 15.5 wt % calculated on a dry, water and carbon dioxide free basis, of the final binder material.

Optionally, the final binder material may also comprise a sodium complex binder, for example EDTA (Ethylenediaminetetraacetic Acid):

up to 1 wt %

Hence, the composition of the final binder material according to Example 4 may be the following, calculated on a dry, water and carbon dioxide free basis:

| Base component: | 84.5 wt % |
| Activator component: | 15.5 wt % |
| TOTAL final binder material: | 100 wt % |

*If the complex binder amounts to less than 1 wt %, or if there is no complex binder at all, the amounts of the base component and the activator component are increased correspondingly.

The base component and the activator component indicated above, but no sodium complex binder, were supplied to a mixer of the type PFT Multimix, available from Knauf PFT GmbH & Co. KG, Iphofen, DE, and where mixed with each other to form a homogenous powder mixture constituting the first final binder material of Example 4.

The first final binder material of Example 4 as described above was then used to prepare a concrete type material. The concrete type material was formed by mixing the following components in a concrete mixer (AL-KO TOP 1402 R) during one hour, the concrete type material comprising the following ingredients:

4) Final binder material (according to Example 1) calculated on a dry, water and carbon dioxide free basis:
   250 parts by weight,
5) CEN Normsand, sand according to DIN-EN 196-1, available from the company Normensand GmbH, Beckum, DE:
   670 parts by weight,
6) Water:
   80 parts by weight.

The total weight of the mixture was about 10 kg.

The pH of the mixture of the final binder material, aggregate and water according to Example 4 was found to be pH 13.

A second binder material according to Example 4 was prepared by using a base component, an activator component and optionally a sodium complex binder according to an embodiment of the present invention.

The base component had the following composition, in wt % of the final binder material:

Ground granulated blast furnace slag (GGBS), in the form of the product "AHWZ Gemahlener Hüttensand", available from the company Firma Bernegger GmbH, Molln, AT, the product having a Blaine number of 5010 cm$^2$/g, and a residue after sieving through a 45 micrometer sieve of 7.5 wt %, the amount calculated on a dry, water and carbon dioxide free basis:

70.0 wt %

Amorphous aluminum oxide, as Aluminiumoxyd trocken SO143, obtained from Dadco Alumina Ltd, the facilities at Stade, DE, the amount calculated as $Al_2O_3$, on a dry, water and carbon dioxide free basis:

10 wt %

Thus, the base component constituted totally 80.0 wt %, calculated on a dry, water and carbon dioxide free basis, of the final binder material.

Furthermore, the binder material comprised an activator component. The activator component had the following composition, in wt % of the final binder material:

Sodium carbonate, purchased as Natrium carbonat light, CAS 497-19-8, from Soda Polska Ciech, Inowroclaw, PL, the amount calculated as $Na_2CO_3$, on a dry, water and carbon dioxide free basis:

17.0 wt %

Calcium oxide, purchased as Kalkoxyd from Kalkwerk Dullinger, Salzburg-Elsbethen, AT, the amount calculated as CaO, on a dry, water and carbon dioxide free basis:

3 wt %

Thus, the activator component constituted totally 20 wt % calculated on a dry, water and carbon dioxide free basis, of the final binder material.

Optionally, the final binder material may also comprise a sodium complex binder, for example EDTA (Ethylenediaminetetraacetic Acid):

up to 1 wt %

Hence, the composition of the second final binder material according to Example 4 may be the following, calculated on a dry, water and carbon dioxide free basis:

| Base component: | 80.0 wt % |
| Activator component: | 20.0 wt % |
| TOTAL final binder material: | 100 wt % |

*If the complex binder amounts to less than 1 wt %, or if there is no complex binder at all, the amounts of the base component and the activator component are increased correspondingly.

The base component and the activator component indicated above, but no sodium complex binder, were supplied to a mixer of the type PFT Multimix, available from Knauf PFT GmbH & Co. KG, Iphofen, DE, and where mixed with each other to form a homogenous powder mixture constituting the final binder material of Example 4.

The final binder material of Example 4 as described above was then used to prepare a concrete type material. The concrete type material was formed by mixing the following components in a concrete mixer (AL-KO TOP 1402 R) during one hour, the concrete type material comprising the following ingredients:

7) Final binder material (according to Example 4) calculated on a dry, water and carbon dioxide free basis:
   250 parts by weight,
8) CEN Normsand, sand according to DIN-EN 196-1, available from the company Normensand GmbH, Beckum, DE:
   670 parts by weight,
9) Water:
   80 parts by weight.

The total weight of the mixture was about 10 kg.

The pH of the mixture of the final binder material, aggregate and water according to Example 4 was found to be pH 13.

The tests in Example 4 show the effect of the aluminium ions used according to the present invention. The tests were also made on formulations with and without aluminion containing material. Determinations of the strength were made in accordance with ÖNORM EN 196-1, par 1, after 1 day.

TABLE 3

Test results of test sample according to Example 4.

| Age of the specimen | Dimensions of specimen [mm] | Compressive strength [N/mm$^2$] Formula with Aluminium | Compressive strength [N/mm$^2$] Formula without Aluminium |
|---|---|---|---|
| 24 hours | 40 × 40 × 160 | 13.8 | 10.2 |

As can be seen from the results the use of aluminium plays an important role of the strength property when using an alkali activated slag binder as according to the present invention.

It will be appreciated that numerous modifications of the embodiments described above are possible within the scope of the appended claims.

To summarize, a binder material useful for forming a concrete type material comprises, calculated on a dry, water and carbon dioxide free basis, a base component constituting 50-95 wt % of the binder material and comprising ground granulated blast furnace slag, and an activator component constituting 5-50 wt % of the binder material and comprising aluminum sulfate, and a sodium hydroxide generating compound. The final binder material comprises, calculated on a dry, water and carbon dioxide free basis: ground granulated blast-furnace slag: 35-95 wt %, aluminum sulfate, $Al_2(SO_4)_3$: 1-25 wt %, sodium hydroxide generating compound: 4-35 wt %.

The invention claimed is:

1. A concrete material, wherein it comprises a binder material and an aggregate material, wherein the binder material comprising, calculated on a dry, water and carbon dioxide free basis;
   i) a base component constituting 50-95 wt % of the binder material, said base component comprising ground granulated blast furnace slag, wherein the base component comprises at least 20 wt % aluminum oxide, $Al_2O_3$, calculated on a dry, water and carbon dioxide free basis, and ii) an activator component constituting 5-50 wt % of the binder material, said activator component comprising:
      a. aluminum sulfate, and
      b. sodium hydroxide generating compound, said sodium hydroxide generating compound comprising sodium carbonate, $Na_2CO_3$, and calcium oxide, CaO,
   wherein the binder material comprises, calculated on a dry, water and carbon dioxide free basis;
   ground granulated blast furnace slag: 35-95 wt %
   aluminum sulfate, $Al_2(SO_4)_3$: 1-25 wt % and
   sodium hydroxide generating compound: 4-35 wt %.

2. The concrete material according to claim 1, wherein the binder material comprises aluminum sulfate, calculated on a dry, water and carbon dioxide free basis, calculated as $Al_2(SO_4)_3$, in an amount of: 10-20 wt %.

3. The concrete material according to claim 1, wherein the binder material comprises sodium carbonate, calculated on a dry, water and carbon dioxide free basis, calculated as $Na_2CO_3$, in an amount of: 10-20 wt %.

4. The concrete material according to claim 1, wherein the base component comprises at least 15 wt % silicon oxide, $SiO_2$, calculated on a dry, water and carbon dioxide free basis.

5. The concrete material according to claim 1, wherein the binder material comprises aluminum sulfate, calculated on a dry, water and carbon dioxide free basis, calculated as $Al_2(SO_4)_3$, in an amount of: 5-20 wt %.

6. The concrete material according to claim 1, wherein the binder material comprises sodium carbonate, calculated on a dry, water and carbon dioxide free basis, calculated as $Na_2CO_3$, in an amount of: 2-25 wt %, and calcium oxide, calculated on a dry, water and carbon dioxide free basis, calculated as CaO, in an amount of: 1.5-5 wt %.

7. The concrete material according to claim 1, wherein the binder material comprises maximum 2 wt % of calcium sulfate, $CaSO_4$, calculated on a dry, water and carbon dioxide free basis.

8. The concrete material according to claim 1, wherein the binder material further comprises a sodium complex binder.

9. The concrete material according to claim 1, wherein the activator component comprises aluminum sulfate, $Al_2(SO_4)_3$, and sodium hydroxide generating compound in such a relation that a mixture of 1 part by weight of the binder material with 0.3 parts by weight of water results in a pH value of at least 12.5.

10. The concrete material according to claim 1, wherein the base component comprises, in addition to ground granulated blast furnace slag, at least one substance selected from the group consisting of: clay, marl, fly ash, and aluminum oxide.

11. The concrete material according to claim 1, wherein the binder material is ground to a Blaine number of at least 3500 cm$^2$/g.

12. A method of producing a concrete material, comprising mixing the binder material according to claim 1, with water and an aggregate material, and allowing the mixture to harden to form the concrete material.

13. The method according to claim 12, further comprising mixing 1 part by weight of the binder material with 2-8 parts by weight of the aggregate material, and adding 0.2-1.5 parts by weight of water.

* * * * *